(12) United States Patent
Lowry et al.

(10) Patent No.: US 6,579,324 B1
(45) Date of Patent: Jun. 17, 2003

(54) METHOD FOR INDICATING A SELECTED REGION ON A COMPUTER DISPLAY WHILE ALLOWING THE USER TO SEE THE FORMATTING OF THE BACKGROUND AND CONTENT ITEMS WITHIN THE SELECTED REGION

(75) Inventors: Kent R. Lowry, Seattle, WA (US); Howard Wesley Cherry, Seattle, WA (US); Willard Bruce Jones, Seattle, WA (US); Tjeerd Hoek, Kirkland, WA (US); Justin Maguire, III, Seattle, WA (US); John A. Tholen, Monroe, WA (US); Richard M. Banks, London (GB); Terrence T. Huang, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/302,824

(22) Filed: Apr. 30, 1999

(51) Int. Cl.$^7$ .............................................. G06F 17/00
(52) U.S. Cl. ........................ 715/504; 345/592; 345/629
(58) Field of Search ................................ 707/503, 504; 345/592, 629–630, 639, 581, 589

(56) References Cited

U.S. PATENT DOCUMENTS

| | | | | |
|---|---|---|---|---|
| 4,992,780 A | * | 2/1991 | Penna et al. ................ | 345/422 |
| 5,260,695 A | * | 11/1993 | Gengler et al. ............. | 345/592 |
| 5,339,386 A | * | 8/1994 | Sodenberg et al. ......... | 345/420 |
| 5,416,895 A | * | 5/1995 | Anderson et al. ........... | 345/803 |
| 6,057,837 A | * | 5/2000 | Hatakeda et al. ........... | 345/708 |
| 6,208,351 B1 | * | 3/2001 | Borg et al. ................. | 345/592 |
| 6,256,649 B1 | * | 7/2001 | Mackinlay et al. ......... | 345/473 |
| 6,289,364 B1 | * | 9/2001 | Borg et al. ................. | 345/629 |
| 6,320,580 B1 | * | 11/2001 | Yasui et al. ................. | 345/421 |
| 6,337,698 B1 | * | 1/2002 | Keely et al. ................ | 345/777 |
| 6,384,840 B1 | * | 5/2002 | Frank et al. ................ | 345/629 |

* cited by examiner

*Primary Examiner*—Joseph H. Feild
(74) *Attorney, Agent, or Firm*—Merchant & Gould

(57) ABSTRACT

A method for using an indicator, known as "See Through View," that allows a user to select a region on the display device and still see the visual attributes of the contents as they will appear when the region is deselected. When the user selects a region on the display device, the invention "shades" the background of the selected region. The contents within the selected region are left unchanged. Shading is accomplished by combining each original background base color with a selection shading color to produce a corresponding blended color, or colors. If the corresponding blended color is similar to the background base color, the blended color is either lightened or darkened, as needed to produce an adjusted blended color. Each blended color, or the adjusted blended color (as required) replaces the corresponding base background color within the selected region. The effect is that the selected region and background items appear "shaded." This allows the user to see the visual attributes of the contents of the selected region, as they would actually appear.

26 Claims, 6 Drawing Sheets

METHOD FOR INDICATING A SELECTED REGION ON A COMPUTER DISPLAY WHILE ALLOWING THE USER TO SEE THE FORMATTING OF THE BACKGROUND AND CONTENT ITEMS WITHIN THE SELECTED REGION

TECHNICAL FIELD

This invention relates to the selection of a region on a graphical user interface and, more particularly, relates to an improved method of showing a selection on a graphical user interface without interfering with the user's view of the visual attributes of the contents within the selection.

BACKGROUND OF THE INVENTION

Most modern computer software uses a graphical user interface (GUI) to display information to and receive commands from users. The GUI allows a user to view the contents of their documents on the computer display just as it would appear when printed out. This is technology is known as WYSIWYG, an acronym for "What You See Is What You Get." A user typically interacts with the GUI through a pointing device (e.g., a mouse) to position a pointer or cursor over an object and "clicking" on the object. The user can also click and drag the pointing device to highlight, or select, sections of the display. Examples of operating systems that provide graphical user interfaces and WYSISYG technologies are WINDOWS 95 and WINDOWS 98, which are manufactured by the Microsoft Corporation of Redmond, Wash.

In a computer system using a GUI, the user who uses a mouse to make a selection can highlight a selection by positioning the cursor at the beginning of the section, pressing and holding down the mouse button, and dragging the cursor to the end of the selection. This selection technique is known as "click and drag." It should be noted that alternative methods, such as using the keyboard, selecting a command function, executing a macro routine or executing a Visual Basic routine, may also be used to highlight a selection. Once a region is selected in this manner, the user can change the visible attributes of the background and content items within the region using the menu items and other control features of the GUI. Click and drag techniques allow users to quickly select a block of text, an object, etc. and change the visual attributes associated with the selected region. The GUI highlights the selected region by changing the background base color with a background selection color. Typically, the GUI shows the background selection color in reverse video. Reverse video sets the background selection color to the complement of the background base color. Also, reverse video replaces the cell content colors with their complementary colors. For example, black text on a white background appears as white text on a black background.

A useful computer program module that implements the GUI and WYSIWYG technologies is Microsoft's EXCEL 97 spreadsheet program. The display area associated with this program is divided into a plurality of cells defining rows and columns. Each cell may contain attributes unique from every other cell. Thus, each cell may have a unique fill or background base color and contain cell contents formatted differently from the contents of every other cell. To simultaneously change the attributes of multiple cells, the user typically selects a range of cells using the click and drag (or equivalent) technique. The selected range has two components: an active cell that is the current focus of the activity (typically, the cell containing the cursor) and non-active cells (typically the remaining cells in the selected range).

When users select two or more cells in a spreadsheet, the current convention displays the non-active cells in reverse video and leaves the active cell unchanged. Reverse video sets the background selection color to the complement of the background base color and replaces the cell content color with its complementary color. For example, if a cell contains a red text on a yellow background, reverse video results in turquoise (complement of red) text displayed on a blue background selection color (complement of yellow). As a result, the user cannot see the visual attributes of the cells in the selected region as they actually appear. Referring to the previous example, the font appears turquoise rather than red. This confuses users as to how the spreadsheet formatting actually appears. In particular, users may become confused when they attempt to manipulate the visual attributes of the content items in the selected range. Returning to the example, a user changing the red font to a green font would see magenta (complement of green) content items within the selected region. Only upon completion of the font change and deselection of the region would the content items appear green.

Thus, applying reverse video to a selected region confuses users as to the actual formatting of the selected region. In many instances, this leads to users deselecting and reselecting the same region repeatedly to confirm that their formatting tasks are successful. The confusion and constant selecting and deselecting of the same region leads to an inefficient use of time, user frustration and may cause errors associated with the user forgetting to reselect the region to make further changes.

Some computer program modules have attempted to solve these problems. For example, one selection technique applies reverse video only to the background and not to the cell contents. In this manner, the format of the cell contents is left unchanged, while the background is displayed in its complementary color. Another selection technique allows the user to select the background selection color for the non-active cells. For example, if the user chooses blue as the background selection color, red text initially displayed on a yellow background will appear as red text on a blue background after the user selects the region.

However, both of these methods have shortcomings. Specifically, if the cell contents are the same color as the background selection color, the user cannot see the content items in the selected region. This is because in both methods, the GUI paints the background selection color (either the reverse video color or the selected color) over the background base color.

Thus, there is a need in the art for a more efficient method for indicating a selected region of a computer display using a graphical user interface. There is a further need in the art for a method for indicating a selected region on a computer display without interfering with the user's view of the visual attributes within the selection.

SUMMARY OF THE INVENTION

The present invention meets the above-described needs by providing a utility for indicating a selected region on a computer GUI while allowing the user to see the formatting through the selection indicator. This utility, which is referred to as "See Through View," blends the background base color with a selection shading color to create the background selection color. In addition, the content items are not blended. This allows the user to select a region on the display device and still see the formatting of the background and the content items similar to the way they will appear when the region is deselected.

In other words, when the user selects a region on the display device, the invention "shades" the background of the non-active cells of the selected region and leaves the cell content items unchanged. The shading is accomplished by combining the background base color with a selection shading color to produce a blended color. For example, the selection shading color may be a Windows system color used as a standard selection color to indicate selection in all Windows programs.

When a user selects a region, the blended color becomes the background selection color, which replaces the original background base color. The effect is that the background of the non-active cells appears shaded or darkened. For example, if the selection shading color is set to blue and a user selects a region of the display screen with a red background base color, the background selection color will appear red with blue shading, as opposed to turquoise (i.e., in reverse video), but still appears selected due to the blue shading. Because the cell contents remain unchanged, the user can see the visual attributes of the cell contents, as they would actually appear. This selection technique also allows the user to see any background items, which appear shaded yet still visible.

Generally described, the See Through View utility provides a user the ability to highlight a selected region on a computer display device and still see the formatting of the contents as it will appear after the region is deselected. The user first selects a region within the computer display using an input device (e.g., a mouse). For example, the user places the cursor in the first cell of the region to be selected and presses and holds the mouse button. The user then drags the cursor, while keeping the mouse button depressed, to the last cell in the region to be selected (the user could select the region using alternative methods, such as the keyboard).

Next, the See Through View utility determines whether the region contains only a single cell or multiple cells. If the region only contains a single cell, the background and cell contents are left unchanged. If the selected region contains multiple cells, the region is divided into an active cell and non-active cells. The active cell is the cell that contains the cursor and has the focus of the current activity. The attributes of the cell contents of the selected region (both the active cell and the non-active cells) are left unchanged. The background color of the active cell remains unchanged, and the background colors of the non-active cells are blended with the background selection color.

The present invention may determine the color of the background base color in each non-active cell independently. Specifically, each background base color is combined with a selection shading color to produce a blended color. First, the See Through View utility determines the red, green and blue (RGB) values of the background base color and the selection shading color. The See Through View technique reduces the RGB values of the background base color to 65% of their original value and the RGB values of the selection shading color to 35% of the original values. These values for each color are then combined to produce the blended color.

Next, because the blended color may be similar to the original background color, the See Through View utility compares the colors by comparing the luminance of the blended color with the luminance of the background base color. If the RGB values of the two colors are similar, the utility further alters the blended color to produce an adjusted blended color. Specifically, the utility determines whether the blended color is a dark color. If the blended color is a dark color, the utility lightens the blended color to obtain the adjusted blended color. If the blended color is a light color, the utility darkens the color to obtain the adjusted blended color.

The blended color, or the adjusted blended color (if an adjustment is necessary), replaces the background base color of the non-active cells within the selected region and the content items remain unchanged. As a result, the background of the non-active cells appear as if they were shaded. This allows the visual attributes of the cell contents, such as text color, to remain apparent to the user.

If a background element (e.g., watermark, picture, clip art, etc.) appears in the selected region, the present invention combines the selection shading color with each color of the background element, in the same manner described above, to produce the blended color (or an adjusted blended color, if an adjustment is necessary). That is, the invention replaces each color of the background element with the blended color (or the adjusted blended color). This allows the user to see the background element through the selection.

The attributes of the cell contents in the non-active cells remain unchanged so that the user can see their formatting, as they will appear when the region is deselected. If the user changes the formatting of the visual attributes of the cell items, the changes will be seen immediately, as they would normally appear on the computer display, and not in reverse video.

That the invention improves over the drawbacks of prior methods for indicating a selected area on a computer display device and accomplishes the advantages described above will become apparent from the following detailed description of the embodiments of the invention and the appended drawings and claims.

DETAILED DESCRIPTION OF THE EMBODIMENTS OF THE INVENTION

Figure 1:
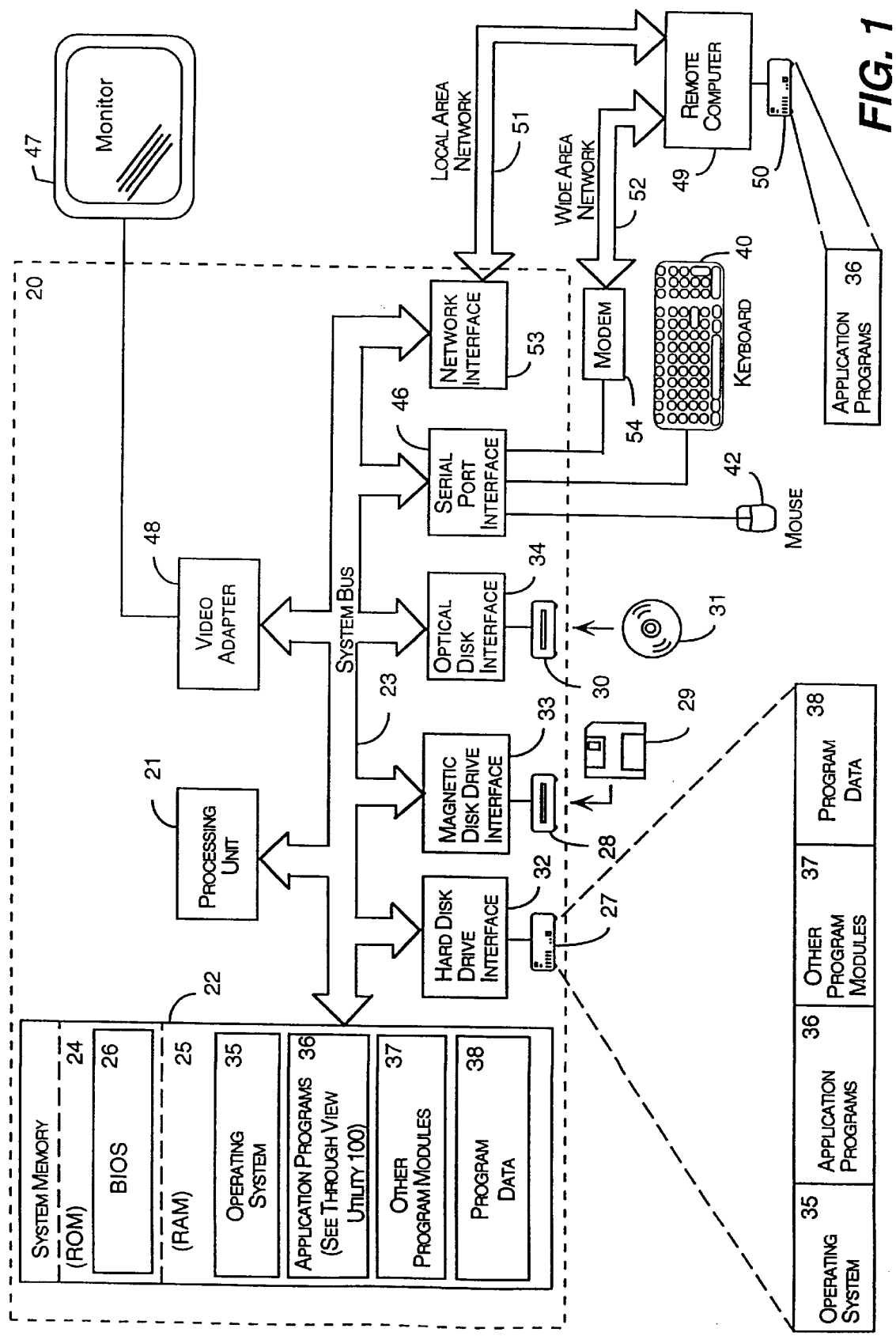
FIG. 1 is a block diagram of a personal computer that provides the operating environment for an embodiment of the present invention.

The present invention may be embodied in a utility for highlighting a selected region on a computer display device such that the visual attributes of the contents are visible to the user, as they will appear when the region is deselected. In one embodiment, the invention is incorporated into a computer spreadsheet program module entitled EXCEL 2000, marketed by Microsoft Corporation of Redmond, Wash. The invention is also incorporated into the spreadsheet component within the OFFICE WEB suite of computer components marketed by the Microsoft Corporation. Briefly described, these programs allows a user to view and manipulate an array of alphanumeric data.

Although the present invention is described in the context of a spreadsheet program, those skilled in the art will appreciate that the invention is applicable not only to spreadsheet programs, but also to other programs that use a graphical user interface and WYSIWYG technologies, such as word processing programs, database programs, presentation programs, compiler programs, and drawing programs.

One way to manipulate alphanumeric data is to alter the visual attributes of the data, such as changing its color. To alter the visual attributes the user selects a region of text by using the pointing device (e.g., a mouse), or the keyboard to position the cursor on the first cell. For example, the user clicks and drags the cursor to the last cell of the selected region using a mouse.

Once the region is selected, the See Through View utility determines whether the selected region contains one cell or multiple cells. If the selected region contains only one cell, the background and the cell content remain unchanged. That is, the See Through View utility does not apply the blending technique to single cell selected regions. If the selected region contains multiple cells, the utility determines which cell is the active cell. As with single cell selections, the See Through View utility does not apply the blending technique to the background of the active cell. The remaining cells within the selected region are non-active cells in which the utility applies blending to the background color.

The See Through View utility operates on a color-use basis. That is, the See Through View utility operates every time the images displayed on the display device are required to be redrawn. Changing the characteristics of the selected region is one situation in which the displayed images are redrawn. However, those skilled in the art will appreciate that other situation exists in which the displayed images need to be redrawn that do not include altering the characteristics of the selected region. For example, the See Through View utility may operate even though the user has taken no action regarding the selected region, such as redrawing cells that have been erased, or resizing the active display window. For illustrative purposes, the following discussion describes the See Through View utility with regards to changing the characteristics of the selected region.

To apply the shading, the utility first determines the background base color of each non-active cell. The background base color of each cell may be a single color or it may be a pattern, which contains multiple colors. The See Through View utility handles both cases in the same manner. For illustrative purposes, the following discussion is directed to the single color case, although it should be understood that this discussion applies equally to the multiple color case. The background base color may be represented as a combination of three-color values. In the preferred embodiment, the color values are RGB, which are, the additive primary color values, although those skilled in the art will appreciate that other color values, such as cyan, magenta, and yellow (CYM) color values and hue, luminance and saturation (HSY) color values can be used with the See Through View utility to produce the desired result. The following discussion is only directed towards RGB color values for illustrative purposes, although other color values could equivalently be substituted in the discussion.

The RGB values correspond to individual colors on a color look-up table that contain all the colors capable of being displayed on a particular display. The number of colors contained on the look-up table corresponds to the number of bits per pixel required to display the color. For display devices that do not have the capability of displaying true colors, such as 256-color displays, the background base color is first converted into a corresponding color palette color. The corresponding color palette color is blended with the selection color. Similarly, the blended color is also converted to a corresponding palette color before it is displayed. For displays capable of displaying more than 256 colors, the original color does not need to be converted to a corresponding color palette color because these displays are capable of displaying each color directly on the display device. The conversion of a base background color to its corresponding palette color is well known in the art and is irrelevant to the invention described. Also, the See Through View technique is disabled for displays incapable of displaying at least 256 colors, such as Monochrome and 16 color displays. For illustrative purposes, the following discussion describes the See Through View technique operating on a system having a 256-color display. However, those skilled in the art will appreciate that the discussion is applicable for all displays capable of displaying at least 256 colors.

Each RGB value ranges from 0 to 255, with 0 value corresponding to the darkest saturation value and 255 corresponding to the lightest saturation value. Those skilled in the art will appreciate that other color representations with different saturation values exist and may be used with the See Through View utility.

Next, the utility determines the RGB values of the selection shading color. Again, the RGB values range form 0 to 255. The selection shading color is typically a user selectable color within the Windows operating system, which indicates selection in all Windows programs. The See Through View utility combines the RGB values of the background base color and the selection shading color to produce the blended color. In the preferred embodiment, combining 65% of the background base color with 35% of the selection shading color produces the blended color. However, other percentages may be used to combine the background base color and the selection shading color, with the percentages typically being additive to one hundred percent.

Once the blended color is produced, it is compared to the background color to insure that the blended color is not similar to the background color using the formula:

$$[|(R_1-R_2)|*2+|(G_1-G_2)|*5+|(B_1-B_2)|*1] > \text{threshold 1}$$

where ($R_1$, $G_1$, $B_1$) and ($R_2$, $G_2$, $B_2$) are the RGB values of the background base and selection shading colors, respectively. The resultant value is compared to a predetermined threshold value. For example, the utility exhibits acceptable performance when the predetermined first threshold is set to 73. Nevertheless, other threshold values may be chosen and used in the See Through View utility to achieve the desired results.

If the utility determines the colors to be similar, the utility then determines whether the blended color is a dark color or a light color by comparing the luminance of the blended color to a second predetermined threshold. The See Through View utility computes the luminance of the blended color using the formula:

$$[(2*|R_3|)+(5*|G_3|)+(|B_3|)]/8 > \text{threshold-2}$$

where ($R_3$, $G_3$, $B_3$) are the RGB values of the blended color. The calculated value is compared to a predetermined threshold-2, which may be set to 128. If the calculated value is greater than 128, the color is considered light, and the blended color is darkened by multiplying each RGB value by 0.65 to produce the adjusted blended color.

If the calculated value is less than 128, the See Through View utility considers the blended color dark and lightens the blended color by increasing each RGB value to produce the adjusted blended color. The adjustment is based on the following formula:

$$R_4 = R_3 + [5*(SV - R_3)/20]$$

which reduces to $$R_4 = R_3 + (SV - R_3)/4$$

where $R_4$ is the red component of the adjusted blended color, $R_3$ is the red component of the blended color, and SV is the lightest saturation value. In the preferred embodiment, SV is set to 255, which corresponds to the saturation value for a 24-bit color representation. However, those skilled in the art will appreciate that other representations employing different saturation can be implemented in the See Through View utility while remaining within the scope of the invention. The utility calculates the red component of the adjusted blended color by adding ¼ of the difference between the lightest saturation value and the value of the red component of the blended color. The See Through View Utility calculates the green and blue components for the adjusted blended color in the same manner. In the preferred embodiment, the difference is multiplied by ¼. However, those skilled in the art will appreciate that alternative multipliers may be used to lighten each RGB component and still remain within the scope of the invention.

Once the appropriate blended color is achieved, the See Through View utility replaces the background base color of each non-active cells in the selected region with the blended color (or adjusted blended color, when appropriate). The See Through View utility also stores the most recent background base color and blended color (or adjusted blended color, when appropriate) in a computer cache memory. This improves the performance of the See Through View utility by allowing the utility to change the background base color to the blended color quickly, and vice versa, when the selected region contains contiguous cells with the identical background base color. The utility can simply retrieve the blended color from the cache memory rather than re-computing the blended color for each cell.

The See Through View utility leaves the cell contents unchanged so that their visible attributes appear to the user as they would when the region is deselected. In this way, the cell contents and the background appear to the user as they would when the region is deselected. For example, if the user selects a region on a spreadsheet containing blue text on a red background using the See Through View utility, the user sees blue text on shaded red background. If the user subsequently changes the attribute of the cell contents to green text on a yellow background, the user sees green text on a shaded yellow background.

Furthermore, the See Through View utility applies the blending technique to background elements within the selected region (e.g., watermarks, cell borders, and so forth) so that they appear to the user can see the background elements through the background selection color. To achieve this result, the See Through View utility applies the blending technique described above to each color of each background element, producing a blended color (or adjusted blended color) for every color of each background element. The See Through View utility then replaces each color of each background element with the corresponding blended color (or adjusted blended color) thus allowing the user to see each background element through the background selection color. For example, if the selected region contains white text on a yellow colored "M" watermark on a blue background, See Through View utility displays the selected region as white text on a darkened blue background containing a shaded yellow "M" watermark.

Referring now to the drawings, in which like numerals represent like elements throughout the several figures, embodiments of the present invention and an exemplary operating environment will be described.

Exemplary Operating Environment

FIG. 1 and the following discussion are intended to provide a brief, general description of a suitable computing environment in which the invention may be implemented. While the invention will be described in the general context of a spreadsheet program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36 which may include the See Through View utility application 100, other program modules 37, and program data 38. The See Through View utility may be a stand-alone utility, or it may be a utility within the operating system, or it may be an individual application program module. In an object oriented programming environment, the See Through View utility may be included as a DLL (dynamic link library that may be called by a variety of program modules. In the EXCEL embodiment of the invention, the See Through View utility is configured as utility within the application program.

A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Exemplary Embodiment of the Invention

Figure 2:
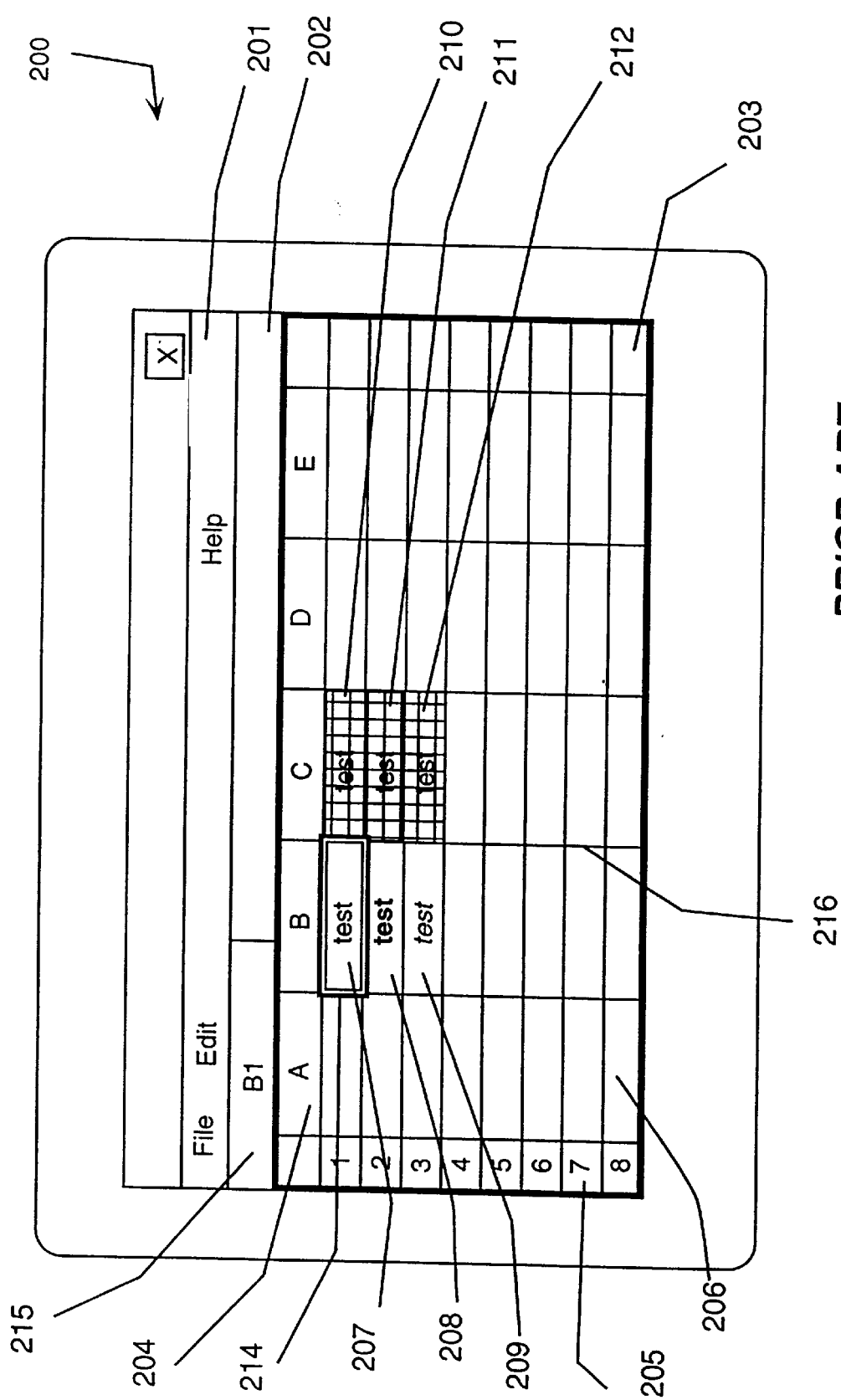
FIG. 2 is a prior art screen display illustrating a typical unselected region in a spreadsheet program module.

FIG. 2 illustrates a typical prior art screen display in Microsoft's EXCEL 97 spreadsheet program module. A window 200 includes a drop down menu bar 201 and a status bar 202. The contents of the spreadsheet program module are viewed in the viewing area 203, which is divided into columns 204 and rows 205. The intersection of each column 204 and row 205 define a cell 206. Each cell is denoted by its location presented in the format ColumnRow (i.e., A1).

In the illustration, several of the cells contain text, each having a different visual attribute. The content in the cell B1 207 contains the word "test" having normal font attributes. Normal font attributes indicates that no bold, no underline, and no italics are applied to the cell contents (all cell contents appear in black, Times, 12 point font unless otherwise indicated). Cell B2 208 contains the contents "test" in bold font. Cell B3 209 contains the contents "test" in italicized font. Cell C1 210, C2 211, and C3 212 all contain the content "test" in normal font displayed on a yellow background.

The active cell, or the cell that is the focus of the current editing, is shown as B1 207. The active cell is outlined by a border 214 and indicated in the active cell display box 215. Each cell is separated from every other cell by gridlines 216 that appear in the cell window 203.

Figure 3:
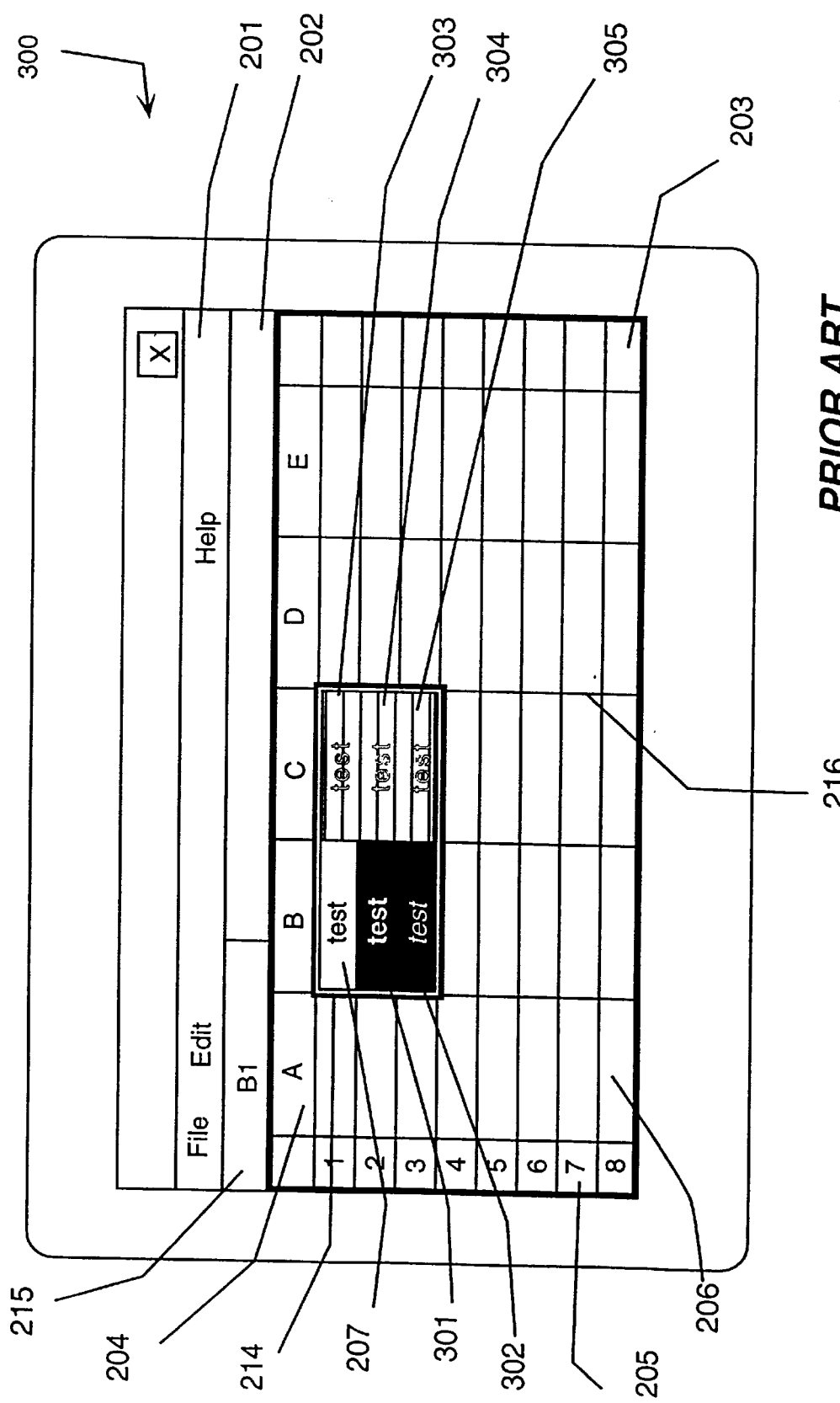
FIG. 3 is a screen display illustrating a prior art technique for indicating a selected region in a spreadsheet program module.

FIG. 3 is an illustration of a window 300 showing a prior art method for indicating a selected region in spreadsheet. The user selected the region defined by cell B1 207 and C3 212 with a pointing device or keyboard. The border 214 previously around cell B1 207 has expanded to surround the selected region. Cell B1 207 remains the active cell. The attributes of the active cell 207 are unchanged.

The remaining cells of the selected region are non-active cells and are displayed in reverse video. Reverse video changes the color of the cell contents and the background to their complementary colors. Thus, cells B2 208 and B3 209 appear as white text on a black background and cells C1 210 through C3 212 now appear as white text on a blue background.

Figure 4:
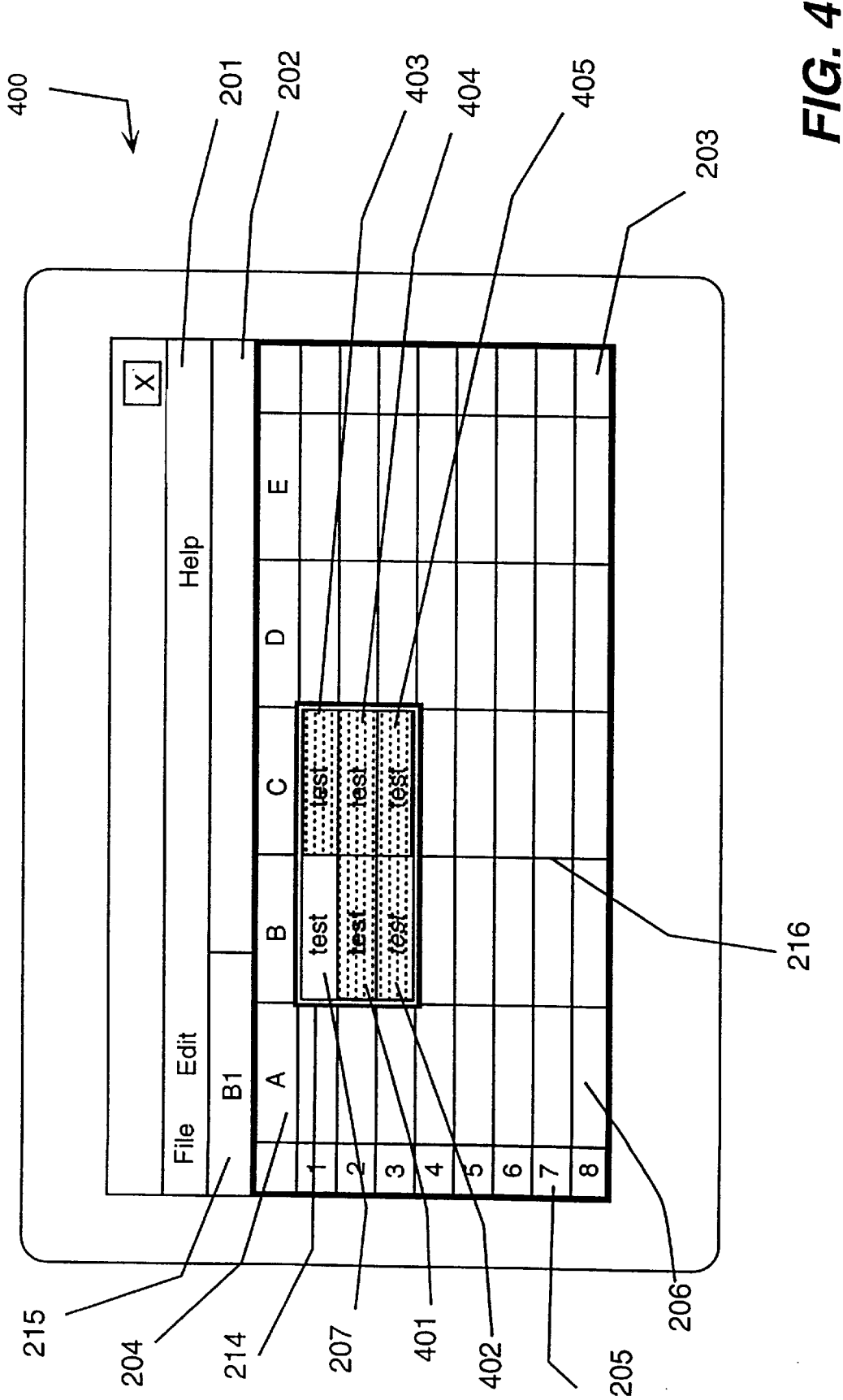
FIG. 4 is a screen display illustrating a See Through View utility for indicating a selected region in a spreadsheet program module in allowance with an embodiment of the present invention.

FIG. 4 is an illustration of a window 400 detailing a region on a spreadsheet selected using the See Through View utility. Cell B1 207 in the upper left-hand corner and cell C3 212 in the lower right hand corner define the selected region. The active cell is again represented as B1 207.

The utility shades the non-active cells of the selected region. The background base colors of the non-active cells are blended with a selection shading color to produce the blended colors. For example, the selection shading color may be set to gray. The particular color used as the selection color is not essential to the See Through View utility, and those skilled in the art will appreciate that other colors may be chosen as the selection shading color, such as light blue, to achieve the desired result of the present invention.

The blended color then replaces the background base color of each cell. In cells B2 208 and B3 209, the utility applies blending to a white background. This produces a blended color, that is a darkened shade of the background base color, which appears gray to the user. In cells C1 210 through C3 212, which had black text on a yellow background, now appears as a grayish yellow color (shown as a dashed region on FIG. 3). The content items of these cells are unchanged. This allows the user to still see visual attributes of the content items, as they appear when the region is deselected. Also, the background elements, such as the gridlines 216, seen through the background selection color by the user.

Figure 5:
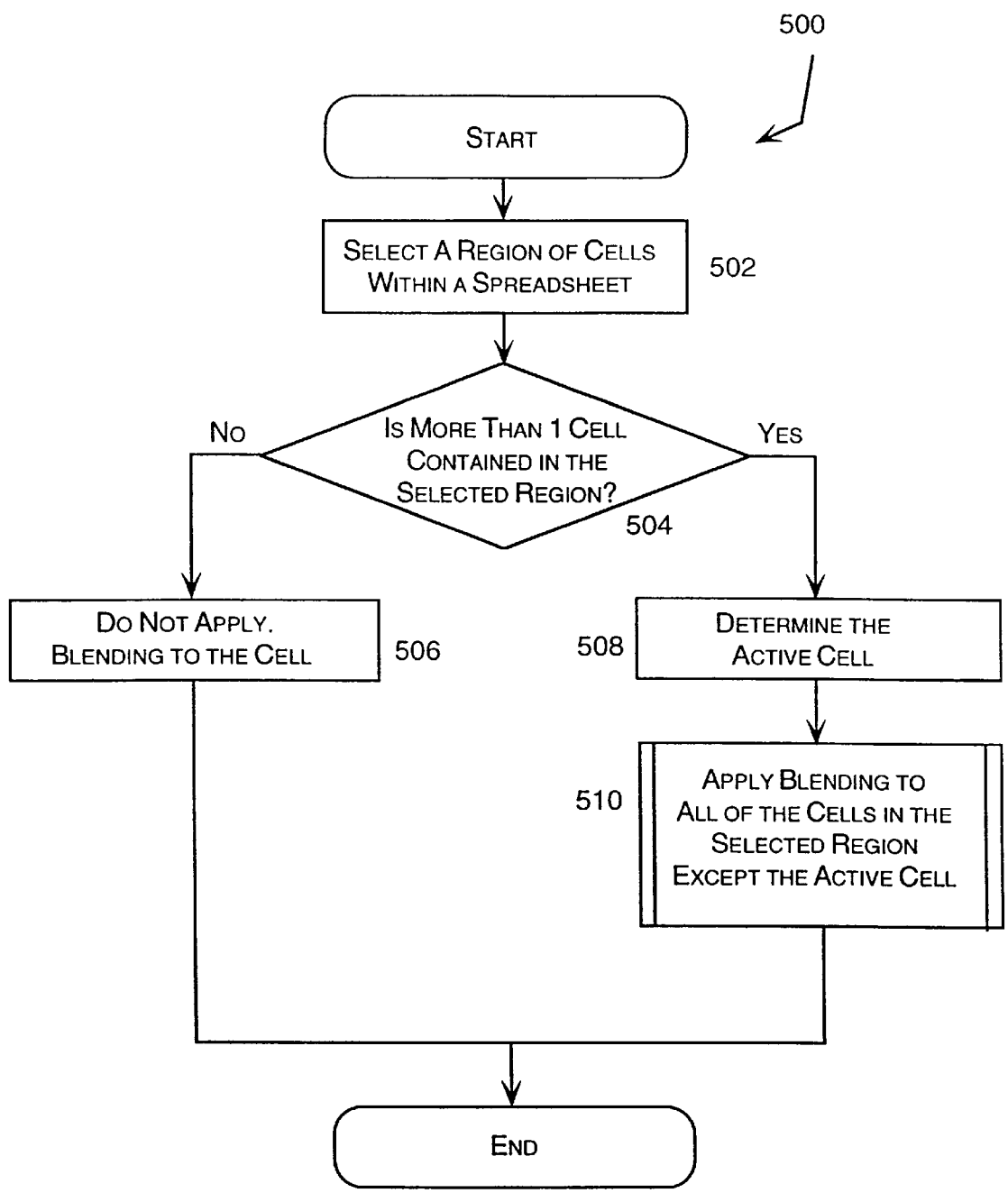
FIG. 5 is a logic flow diagram illustrating an exemplary utility for indicating a selected region using a blended color in a spreadsheet program module.

FIG. 5 is a logic flow diagram illustrating routine 500 for applying the operation of the See Through View technique to the selected region of the computer display device. Those skilled in the art will appreciate that the process described by the logic flow diagram of FIG. 5 is executed by the processing unit 21 (FIG. 1) in response to instructions that have been incorporated into the See Through View utility 100 (STV 100)

The routine 500 begins at step 502, in which the user selects a region of cells within the spreadsheet program module by using a pointing device, such as a mouse. For the purpose of this application, a pointing device is used to select the region of cells within the spreadsheet program module. However, those skilled in the art will appreciate that other alternative methods, such as using the keyboard, selecting a command function, executing a macro routine or executing a Visual Basic routine, may also be used to highlight the region of cells within the spreadsheet program module without affecting the scope of the invention.

Step 502 is followed by step 504, in which the STV utility 100 determines whether the selected region contains more than one cell. If only one cell is within the selected region, the "NO" branch is followed to step 506, in which the STV utility 100 does not apply blending to the cell.

Referring again to step 504, if the STV utility 100 determines that the selected region contains more than one cell, the "YES" branch loops to step 508, in which the STV utility 100 determines the active cell.

Step 508 is followed by routine 510, in which the STV utility 100 applies a blended color (or colors) to each non-active cell within the selected region. Routine 510 is described in greater detail below with reference to FIG. 6. After the blended color is applied, the STV utility 100 proceeds to the "END" step.

Figure 6:
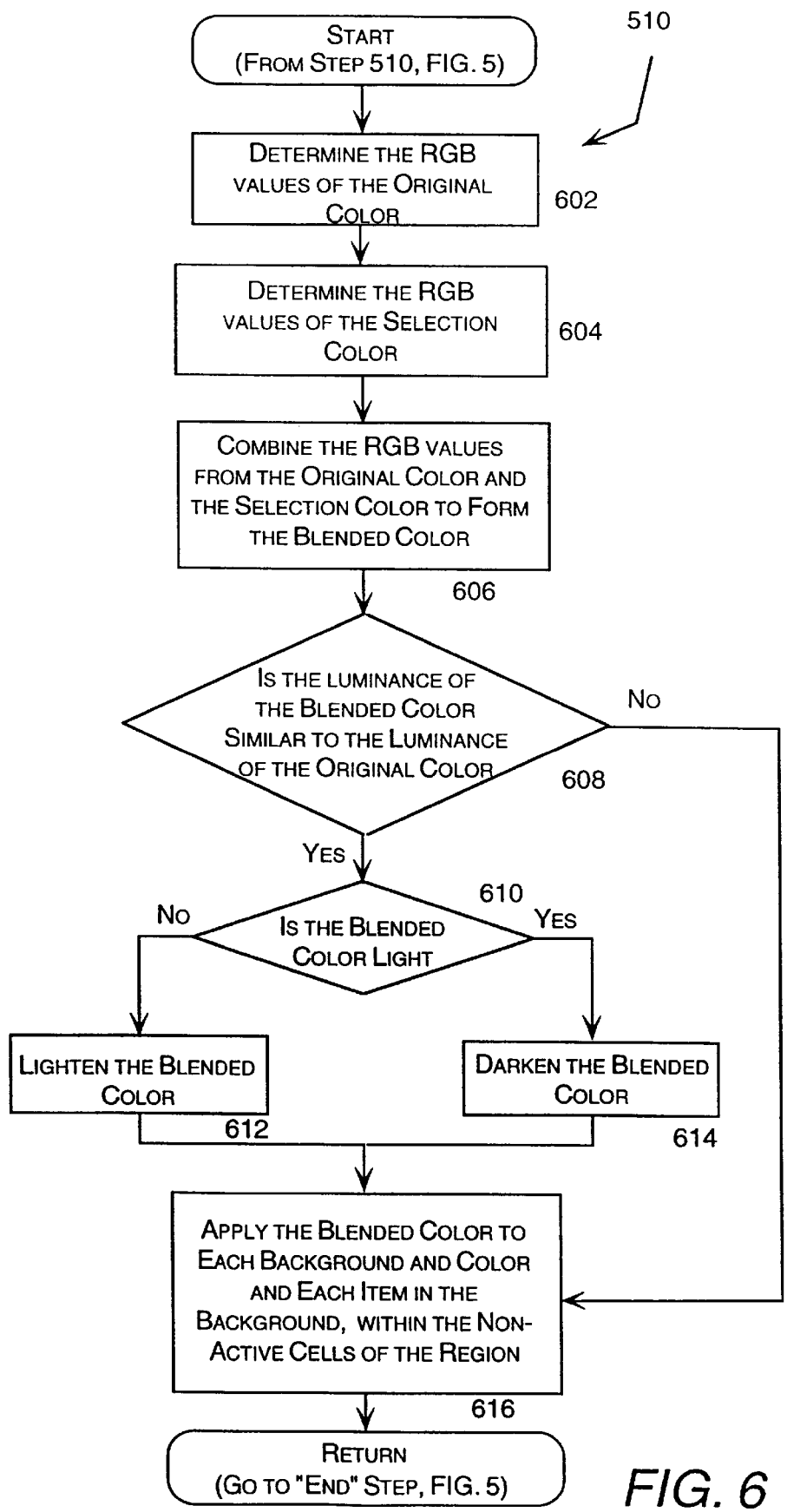
FIG. 6 is a logic flow diagram illustrating an exemplary utility for determining the amount of blending to be applied to the non-active area of the selected region.

FIG. 6 is a logic flow diagram illustrating routine 510 in FIG. 5, which applies the blended color (or colors) to each non-active cells of the selected region. The routine 510 begins after step 508 shown in FIG. 5. At step 602, the STV utility 100 determines the red, green and blue (RGB) values of the background color for each non-active cell in the selected region. Step 602 is followed by step 604, in which the STV utility 100 determines the RGB values of the selection color.

Step 604 is followed by step 606, in which the RGB values of the background color and the selection color are combined to form the blended color. Specifically, the STV utility 100 combines a predetermined percentage of each component of the background color with a predetermined percentage of each component of the selection color derives the blended color. The predetermined percentage for the background color and the predetermined percentage of the selection color typically add to one hundred (100) percent. For example, if the percentage used for the background color is X and the percentage used for the selection color is Y, the red component of the blended color $R_3$ is defined by the formula:

$$R_3 = X^* |R_1| + Y^* |R_2|$$

where $R_1$ is the red component of the background color and $R_2$ is the red component of the selection color. The green and blue components are computed in the same manner. The resultant RGB values are combined to yield the blended color. In the exemplary embodiment, X has the value 65% and Y has the value 35% Those skilled in the art appreciate that other percentages may be used to combine the two colors together to make the blended color.

Step 606 is followed by step 608, in which the luminance of the blended color is compared to the luminance of the background color to determine if the two colors are similar. Specifically, STV utility 100 calculates a luminance comparison value based on the RGB values of the blended color and the background color and compares it to a predetermined threshold value. The luminance comparison value is derived by first determining the difference between the each RGB value of the two colors. Next, each difference is multiplied by a separate weighting factor. The resulting products are summed and compared to a predetermined threshold. For example, the calculated value may be determined using the formula $$[|(R_1-R_2)|*2+|(G_1-G_2)|*5+|(B_1-B_2)|*1] > \text{threshold-1}.$$

If the calculated value is greater than the predetermined threshold-1, the two colors are considered to be similar. In particular, the predetermined threshold-1 may be set to 73. If the calculated value is greater than the threshold-1, the STV utility 100 determined that the colors are similar.

If the STV utility 100 determines the luminance of the background and the selection colors to be similar, the STV utility 100 follows the "YES" branch from step 608 to step 610, in which the utility determines whether the blended color is a light color or a dark color, using a predetermined threshold. The determination is based on the following formula:

$$[(2*|R_3|)+(5*|G_3|)+(|B_3|*1)]/8 > \text{threshold-2}$$

If the resultant value is greater than the predetermined threshold-2, the color is determined to be a light color. In particular, the predetermined threshold 2 may be set to 128. If the resultant value is greater than the threshold 2, the STV utility 100 determined that the color is light and the "YES" branch is followed to step 614, in which the blended color is darkened by multiplying each color component by 0.65.

Step 614 is followed by step 616, in which the blended color is applied to the background base colors, including all background items, such as the gridlines connected to the non-active cells within the selected region. Step 616 is followed by the "RETURN" step, which returns to the "END" steps in FIG. 5.

Referring again to step 610, if the resultant value is less than 128, the "NO" branch proceeds to step 612, in which the blended color is lightened. The RGB components of the blended color are lightened to produce the adjusted blended color based on the following formula:

$$R_4 = R_3 + [5*(SV-R_3)/20]$$

which reduces to $$R_4 = R_3 + (SV-R_3)/4$$

where $R_4$ is the red component of the darkened color, $R_3$ is the red component of the blended color, and SV is the lightest saturation value. In the preferred embodiment, SV is set to 255, which corresponds to the saturation value for a 24-bit color representation. However, those skilled in the art will appreciate that other color representations employing different saturation values can be implemented in the See Through View utility while remaining within the scope of the invention. The green and blue components are calculated in the same manner. Step 612 is followed by step 616, in which the blended color is applied to each background color, any background items, and any borders within the selected region. Step 616 is followed by the "RETURN" step, in which the alarm routine returns to the "END" step in FIG. 5.

Referring again to step 608, if the STV utility 100 determines the blended color and the background color are dissimilar, the utility proceeds directly to 616. Step 616 is followed by the "RETURN" step, in which the alarm routine returns to the "END" step in FIG. 5.

The present invention thus provides a method for selecting a region on a display device without interfering with the user's view of the visual attributes within the selected region. The system retains the color and formatting within the selected region and applies color blending instead of reverse video.

It should be understood that the foregoing pertains only to the preferred embodiments of the present invention, and that numerous changes may be made to the embodiments described herein without departing from the spirit and scope of the invention.

What is claimed is:

1. A computer-readable medium storing computer-executable instructions for performing the steps of:
   receiving a user command from an input device selecting a region displayed on a display device including a background having a background base color and a plurality of content items, each content item having a plurality of associated visual attributes;
   blending the background base color with a selection shading color to produce a background selection color;
   replacing the background base color with the background selection color; and
   visibly displaying the content items and their associated visual attributes in the selected region so that a user will see the content items and their associated visual attributes in the selected region as they will appear when the region is deselected.

2. The computer-readable medium of claim 1, wherein the step of blending the background base color with the selection shading color further comprises the steps of:
   determining a first set of color values defining the background base color:
   determining a second set of color values defining the selection shading color; and
   combining the color values of the background base color and the selection shading color to produce the blended color having a third set of color values, wherein the third set of color values are equal to a first predetermined percentage of the background base color plus a second predetermined percentage of the selection shading color.

3. The computer-readable medium of claim 2, wherein the first predetermined percentage and the second predetermined percentage being additive to one hundred percent.

4. The computer-readable medium of claim 2, wherein the step of blending the background base color with a selection shading color further comprises the steps of:
   determining whether the blended color is similar to the background base color;
   if the blended color is similar to the background base color,
      determining whether the blended color is a light color,
      if the blended color is a light color, darkening the blended color to obtain an adjusted blended color, and
      if the blended color is not a light color, lightening the blended color to produce the adjusted blended color, and
   replacing the background selection color with the adjusted blended color.

5. The computer-readable medium of claim 4, wherein the step of determining whether the background base color is similar to the blended color comprises calculating a weighted sum of the difference between the color values of the blended color and the background base color and comparing the weighted sum to a first predetermined threshold value.

6. The computer-readable medium of claim 5, wherein the step of determining whether the blended color is a light color comprises comparing a weighted sum of the color values of the background selection color with a second predetermined threshold value.

7. The computer-readable medium of claim 5, wherein the step of lightening the blended color comprises the steps of:
   for each color value of the blended color,
      multiplying a weighting factor to the difference between the color value and a lightest saturation value for the color to obtain a weighted difference;
      adding the weighted difference for each color value to each color value to produce an adjusted blended color value; and
   replacing the background selection color with the adjusted blended color.

8. The computer-readable medium of claim 5, wherein the step of darkening the blended color comprises the steps of:
   for each color value of the blended color,
      multiplying each color value of the blended color by a weighting factor having a value less than one to produce the adjusted blended color; and
   replacing the background selection color with the adjusted blended color.

9. The computer-readable medium of claim 2, wherein the color values consist essentially of RGB values.

10. The computer-readable medium of claim 1, wherein the plurality of objects are selected from the group consisting essentially of text, numbers, formulas, and drawing layers.

11. The computer-readable medium of claim 1, wherein the attribute of the content items is color.

12. A computer-readable medium storing computer-executable instructions for performing the steps of:
   receiving a user command from an input device selecting a region displayed on a display device including a background having a background base color and a plurality of content items, each content item having a plurality of associated visual attributes;
   dividing the selected region into an active region and a non-active region;
   blending the background base color with a selection shading color to produce a background selection color;
   replacing the background base color with the background selection color; and
   visibly displaying the content items and their associated visual attributes in the selected region so that a user will see the content items and their associated visual attributes in the selected region as they will appear when the region is deselected.

13. The computer-readable medium of claim 12, wherein the step of blending the background base color with the selection shading color further comprises the steps of:
   determining a first set of color values of the background base color:
   determining a second set of color values of the selection shading color; and
   combining the color values of the background base color and the selection shading color to produce the blended color having a third set of color values, wherein the third set of color values are equal to a first predetermined percentage of the background base color plus a second predetermined percentage of the selection shading color, the first predetermined percentage and the second predetermined percentage being additive to one hundred percent.

14. The computer-readable medium of claim 13, wherein the first predetermined percentage and the second predetermined percentage being additive to one hundred percent.

15. The computer-readable medium of claim 13, wherein the step of blending the background base color with a selection shading color further comprises the steps of:

determining whether the blended color is similar to the background base color;

if the blended color is similar to the background base color, determining whether the blended color is a light color, if the blended color is a light color, darkening the blended color to obtain an adjusted blended color, and if the blended color is not a light color, lightening the blended color to produce the adjusted blended color, and replacing the background selection color of the non-active region with the adjusted blended color.

16. The computer-readable medium of claim 15, wherein the step of determining whether the background base color is similar to the blended color comprises calculating a weighted sum of the difference between the color values of the blended color and the background base color and comparing the weighted sum to a first predetermined threshold value.

17. The computer-readable medium of claim 16, wherein the step of determining whether the blended color is a light color comprises comparing a weighted sum of the color values of the background selection color with a second predetermined threshold value.

18. The computer-readable medium of claim 16, wherein the step of lightening the blended color comprises the steps of:

for each color value of the blended color,
multiplying a weighting factor by the difference between the color value and a lightest saturation value for the color to obtain a weighted difference;
adding the weighted difference for each color value to each color value to produce an adjusted blended color value; and
replacing the background selection color with the adjusted blended color.

19. The computer-readable medium of claim 16, wherein the step of darkening the blended color comprises the steps of:

for each color value of the blended color,
multiplying each color value of the blended color by a weighting factor having a value less than one to produce the adjusted blended color; and
replacing the background selection color with the adjusted blended color.

20. The computer-readable medium of claim 13, wherein the color values consist essentially of RGB values.

21. The computer-readable medium of claim 12, wherein the plurality of objects are selected from the group consisting essentially of text, numbers, formulas, and drawing layers.

22. The computer-readable medium of claim 12, wherein the attribute of the content items is color.

23. A computer-readable medium storing computer-executable instructions for performing the steps of:

receiving a user command from an input device selecting a region displayed on a display device including a background having a background base color and a plurality of content items, each content item having a plurality of associated visual attributes;

dividing the selected region into an active region and a non-active region;

determining a first set of color values defining the background base color;

determining a second set of color values defining a selection shading color;

combining the color values of the background base color and the selection shading color to produce a blended color having a third set of color values, wherein the third set of color values are equal to a first predetermined percentage of the background color plus a second predetermined percentage of the second color;

determining if the blended color is similar to the background base color by calculating a weighted sum of the difference between each color value of the blended color and the background base color and comparing the weighted sum to a first predetermined threshold value;

if the blended color is similar to the background base color, determining whether the blended color is a light color by comparing the weighted sum of the color values of the background selection color with a second predetermined threshold value, if the blended color is a light color, multiplying each color value of the blended color by a weighting factor having a value less than one to produce the adjusted blended color and replacing the background selection color of the non-active region with the adjusted blended color, if the blended color is not a light color, multiplying a weighting factor by the difference between each color value and a saturation value;

adding the weighted difference for each color value to each color value to produce an adjusted blended color value;

replacing the background selection color of the non-active region with the adjusted blended color;

in response to a negative determination that the color values of the blended color are similar to the color values of the background color, leaving the color values of the blended color unchanged and replacing the background selection color with the blended color; and visibly displaying the content items and their associated visual attributes in the selected region so that a user will see the content items and their associated visual attributes in the selected region as they will appear when the region is deselected.

24. The computer-readable medium of claim 23, wherein the plurality of objects are selected from the group consisting essentially of text, numbers, formulas, and drawing layers.

25. The computer-readable medium of claim 23, wherein the color values consist essentially of RGB values.

26. The computer-readable medium of claim 23, wherein the attribute of the content items is color.

* * * * *

UNITED STATES PATENT AND TRADEMARK OFFICE
CERTIFICATE OF CORRECTION

PATENT NO.   : 6,579,324 B1
DATED        : June 17, 2003
INVENTOR(S)  : Lowry et al.

It is certified that error appears in the above-identified patent and that said Letters Patent is hereby corrected as shown below:

<u>Column 14,</u>
Line 50, "color:" should read -- color; --

Signed and Sealed this

Thirtieth Day of December, 2003

JAMES E. ROGAN
*Director of the United States Patent and Trademark Office*